UNITED STATES PATENT OFFICE.

W. B. DAVIS, OF BROOKLYN, NEW YORK.

IMPROVEMENT IN COMPOSITIONS FOR PROTECTING SHIPS' BOTTOMS.

Specification forming part of Letters Patent No. 43,169, dated June 14, 1864.

*To all whom it may concern:*

Be it known that I, W. B. DAVIS, of Brooklyn, Kings county, New York, have invented an Improved Composition for Preventing Ships, &c., from Fouling; and I do hereby declare the following to be a full, clear, and exact description of the same.

My composition consists of arsenic, carbonate of copper, linseed-oil, spirits of turpentine or benzine or other equivalent substance, and the residuum of palm-oil or tallow after distillation. These substances are mixed in the following proportions:

|  | Parts. |
|---|---|
| Residuum of palm-oil or tallow | 25 |
| Carbonate of copper | 25 |
| Arsenic | 20 |
| Spirits of turpentine, benzine, or equivalent substance | 25 |
| Linseed-oil | 5 |
| Total | 100 |

In order to coat any surface, such as that of the bottom of a vessel, with my composition, that portion to be coated should first be painted over with two coats of the residuum of palm-oil or tallow after distillation. This effectually prevents the water from coming into contact with the metal, and consequently precludes any galvanic action or oxidation. A coating of the composition is then applied over the tallow or palm-oil.

I have ascertained by practical experiments that when coated with my composition, as above described, a vessel may remain for months in waters noted for the destructive effect of their animalculæ without being injuriously affected in the slightest degree, and that when so protected there is no accumulation whatever upon the bottom of the vessel of barnacles or vegetable deposit. The metal sheathing, when coated with this composition, has also been found to be entirely free from oxidation and unaffected by galvanic action.

The composition may be applied with good results to piers or other objects which are injuriously affected by the action of sea-water or animalculæ.

I am aware that arsenic has been heretofore used in protective compositions for the purpose of destroying the animalculæ; but it has never before been found possible to prevent the water from dissolving the arsenic and removing it from the composition.

I have found that the palm-oil or tallow acts as a perfect shield for the arsenic and effectually prevents the water from acting on it in any manner. The greater portion of the arsenic, however, combines with the carbonate of copper and forms what is known as "Scheele's green," which is not only a very active poison, but is also almost insoluble in water.

I claim as my invention, and desire to secure by Letters Patent—

1. The combination of carbonate of copper and arsenic with the residuum of palm-oil or tallow after distillation, spirits of turpentine, and linseed-oil, or their equivalents, the whole forming a composition for preventing ships, &c., from fouling, as set forth.

2. The use of the residuum of palm-oil or tallow after distillation, in combination with arsenic or with arsenic and copper compounds, in a protective composition, substantially as and for the purpose specified.

In testimony whereof I have signed my name to this specification in the presence of two subscribing witnesses.

W. B. DAVIS.

Witnesses:
 JOHN WHITE,
 CHARLES HOWSON.